United States Patent
Lim et al.

(10) Patent No.: US 9,590,273 B2
(45) Date of Patent: Mar. 7, 2017

(54) NON-AQUEOUS ELECTROLYTE SOLUTION AND LITHIUM SECONDARY BATTERY INCLUDING THE SAME

(71) Applicant: LG Chem, Ltd., Seoul (KR)

(72) Inventors: Young Min Lim, Daejeon (KR); Chul Haeng Lee, Daejeon (KR); Doo Kyung Yang, Daejeon (KR); Kyoung Ho Ahn, Daejeon (KR); Gwang Yeon Kim, Daejeon (KR)

(73) Assignee: LG Chem, Ltd. (KR)

( * ) Notice: Subject to any disclaimer, the term of this patent is extended or adjusted under 35 U.S.C. 154(b) by 284 days.

(21) Appl. No.: 14/293,101

(22) Filed: Jun. 2, 2014

(65) Prior Publication Data

US 2014/0272605 A1    Sep. 18, 2014

Related U.S. Application Data

(63) Continuation of application No. PCT/KR2014/001387, filed on Feb. 20, 2014.

(30) Foreign Application Priority Data

Feb. 20, 2013  (KR) .................. 10-2013-0017990
Feb. 20, 2014  (KR) .................. 10-2014-0019558

(51) Int. Cl.
| | |
|---|---|
| H01M 10/0567 | (2010.01) |
| H01M 6/16 | (2006.01) |
| H01M 10/052 | (2010.01) |
| H01M 10/0568 | (2010.01) |
| H01M 10/0569 | (2010.01) |
| H01M 4/13 | (2010.01) |

(52) U.S. Cl.
CPC ....... *H01M 10/0567* (2013.01); *H01M 6/164* (2013.01); *H01M 6/166* (2013.01); *H01M 6/168* (2013.01); *H01M 10/052* (2013.01); *H01M 10/0568* (2013.01); *H01M 10/0569* (2013.01); *H01M 4/13* (2013.01); *Y02E 60/122* (2013.01)

(58) Field of Classification Search
CPC ......... H01M 10/0567; H01M 10/0568; H01M 10/0569; H01M 10/052; H01M 6/168; H01M 6/166; H01M 6/164; Y02E 60/122
See application file for complete search history.

(56) References Cited

U.S. PATENT DOCUMENTS

| | | |
|---|---|---|
| 2003/0118914 A1 | 6/2003 | Mori |
| 2004/0106047 A1 | 6/2004 | Mie et al. |
| 2006/0240322 A1 | 10/2006 | Xu et al. |
| 2009/0017386 A1 | 1/2009 | Xu et al. |
| 2009/0169992 A1 | 7/2009 | Ishiko et al. |
| 2009/0286155 A1 | 11/2009 | Takehara |
| 2010/0323240 A1 | 12/2010 | Tsujioka et al. |
| 2011/0039163 A1 | 2/2011 | Deguchi et al. |
| 2011/0168956 A1 | 7/2011 | Muthu et al. |
| 2012/0009487 A1 | 1/2012 | Hwang et al. |
| 2012/0164519 A1 | 6/2012 | Lee et al. |
| 2012/0219866 A1 | 8/2012 | Onuki et al. |
| 2012/0244425 A1 | 9/2012 | Tokuda |
| 2012/0258357 A1 | 10/2012 | Kim |
| 2012/0316716 A1 | 12/2012 | Odani et al. |
| 2013/0052543 A1 | 2/2013 | Ihara et al. |
| 2014/0030610 A1 | 1/2014 | Abe et al. |
| 2015/0155555 A1 | 6/2015 | Yamamoto et al. |

FOREIGN PATENT DOCUMENTS

| | | |
|---|---|---|
| CN | 102027624 A | 4/2011 |
| EP | 2485316 A1 | 8/2012 |
| JP | 2004-165151 A | 6/2004 |
| JP | 2009187698 A | 8/2009 |
| JP | 2010282761 A | 12/2010 |
| JP | 2011049153 A | 3/2011 |
| JP | 2011096643 A | 5/2011 |
| KR | 20080004459 A | 1/2008 |
| KR | 2009-0039211 A | 4/2009 |
| KR | 20090118117 A | 11/2009 |
| KR | 20100040843 A | 4/2010 |
| KR | 20120083290 A | 7/2012 |
| KR | 2012-0090755 A | 8/2012 |
| KR | 20120090969 A | 8/2012 |
| KR | 2012-0115839 A | 10/2012 |
| WO | 2009/131419 A2 | 10/2009 |
| WO | 2011/070964 A1 | 6/2011 |
| WO | 2012/141270 A1 | 10/2012 |
| WO | 2014021014 A1 | 2/2014 |
| WO | 2014/104710 A1 | 7/2014 |

OTHER PUBLICATIONS

Search Report from European Appliation No. 14732495.8, dated Jan. 22, 2015.
Zhang et al., "A review on electrolyte additives for lithium-ion batteries," Journal of Power Sources, Elsevier SA, CH vol. 162, No. 2, Nov. 22, 2006, pp. 1379-1394.
Office Action from corresponding European Application No. 14732059.2, dated Oct. 26, 2015.
The Committee of Battery Technology, the Electrochemical Society of Japan, Battery Handbook, OHM Electric Co., Ltd., Feb. 10, 2010, Edition 1, Issue 3, pp. 533-546.
Search report from European Application No. 14732059.2, dated Jan. 19, 2015.
International Search Report for Application No. PCT/KR2014/001386 dated May 26, 2014.
International Search Report for Application No. PCT/KR2014/001387 dated Jun. 3, 2014.

*Primary Examiner* — Laura Weiner
(74) *Attorney, Agent, or Firm* — Lerner, David, Littenberg, Krumholz & Mentlik, LLP

(57) ABSTRACT

Provided are a non-aqueous electrolyte solution which includes a lithium salt including lithium bis(fluorosulfonyl) imide (LiFSI) and an additive including a vinylene carbonate-based compound and a sultone-based compound, and a lithium secondary battery including the non-aqueous electrolyte solution. The lithium secondary battery including the non-aqueous electrolyte solution of the present invention may improve low-temperature output characteristics, high-temperature cycle characteristics, output characteristics after high-temperature storage, and capacity characteristics.

9 Claims, 5 Drawing Sheets

NON-AQUEOUS ELECTROLYTE SOLUTION AND LITHIUM SECONDARY BATTERY INCLUDING THE SAME

CROSS-REFERENCE TO RELATED APPLICATION

The present application is a continuation of International Application No. PCT/KR2014/001387 filed on Feb. 20, 2014, which claims priority to Korean Patent Application No. 10-2013-0017990 filed Feb. 20, 2013 and Korean Patent Application No. 10-2014-0019558 filed Feb. 20, 2014, the disclosures of which are incorporated herein by reference.

TECHNICAL FIELD

The present invention relates to a non-aqueous electrolyte solution including lithium bis(fluorosulfonyl)imide (LiFSI), a vinylene carbonate-based compound, and a sultone-based compound, and a lithium secondary battery including the non-aqueous electrolyte solution.

BACKGROUND ART

Demand for secondary batteries as an energy source has been significantly increased as technology development and demand with respect to mobile devices have increased. Among these secondary batteries, lithium secondary batteries having high energy density and high voltage have been commercialized and widely used.

A lithium metal oxide is used as a cathode active material of a lithium secondary battery, and lithium metal, a lithium alloy, crystalline or amorphous carbon, or a carbon composite is used as an anode active material. A current collector may be coated with the active material of appropriate thickness and length or the active material itself may be coated in the form of a film, and the resultant product is then wound or stacked with an insulating separator to prepare an electrode group. Thereafter, the electrode group is put into a can or a container similar thereto, and a secondary battery is then prepared by injecting an electrolyte solution.

Charge and discharge of the lithium secondary battery is performed while a process of intercalating and deintercalating lithium ions from a lithium metal oxide cathode into and out of a graphite anode is repeated. In this case, since lithium is highly reactive, lithium reacts with the carbon electrode to form $Li_2CO_3$, LiO, or LiOH. Thus, a film may be formed on the surface of the anode. The film is denoted as "solid electrolyte interface (SEI)", wherein the SEI formed at an initial stage of charging may prevent a reaction of the lithium ions with the carbon anode or other materials during the charge and discharge. Also, the SEI may only pass the lithium ions by acting as an ion tunnel. The ion tunnel may prevent the destruction of a structure of the carbon anode due to the co-intercalation of the carbon anode and organic solvents of an electrolyte solution having a high molecular weight which solvates lithium ions and moves therewith.

Therefore, in order to improve high-temperature cycle characteristics and low-temperature output of the lithium secondary battery, a robust SEI must be formed on the anode of the lithium secondary battery. When the SEI is once formed during the first charge, the SEI may prevent the reaction of the lithium ions with the anode or other materials during repeated charge and discharge cycles caused by the subsequent use of the battery, and may act as an ion tunnel that only passes the lithium ions between the electrolyte solution and the anode.

Typically, with respect to an electrolyte solution which does not include an electrolyte solution additive or includes an electrolyte solution additive having poor characteristics, the improvement of low-temperature output characteristics may not be expected due to the formation of non-uniform SEI. In addition, even in the case in which the electrolyte solution additive is included, the surface of the cathode may be decomposed during a high-temperature reaction or the electrolyte solution may generate an oxidation reaction due to the electrolyte solution additive when the input thereof is not adjusted to a required amount. Thus, irreversible capacity of the secondary battery may be eventually increased and output characteristics may be decreased.

DISCLOSURE OF THE INVENTION

Technical Problem

The present invention provides a non-aqueous electrolyte solution for a lithium secondary battery which may improve high-temperature cycle characteristics, output characteristics after high-temperature storage, and capacity characteristics as well as low-temperature output characteristics, and a lithium secondary battery including the same.

Technical Solution

According to an aspect of the present invention, there is provided a non-aqueous electrolyte solution including: i) lithium bis(fluorosulfonyl)imide (LiFSI); ii) an electrolyte solution additive including a vinylene carbonate-based compound and a sultone-based compound; and iii) a non-aqueous organic solvent.

According to another aspect of the present invention, there is provided a lithium secondary battery including a cathode, an anode, and the non-aqueous electrolyte solution.

Advantageous Effects

According to a non-aqueous electrolyte solution for a lithium secondary battery of the present invention, since the non-aqueous electrolyte solution may form a robust solid electrolyte interface (SEI) on an anode during the initial charge of the lithium secondary battery and may prevent the decomposition of the surface of a cathode during a high-temperature cycle and an oxidation reaction of the electrolyte solution, the non-aqueous electrolyte solution may improve high-temperature cycle characteristics, output characteristics after high-temperature storage, and capacity characteristics as well as low-temperature output characteristics.

MODE FOR CARRYING OUT THE INVENTION

Figure 1:
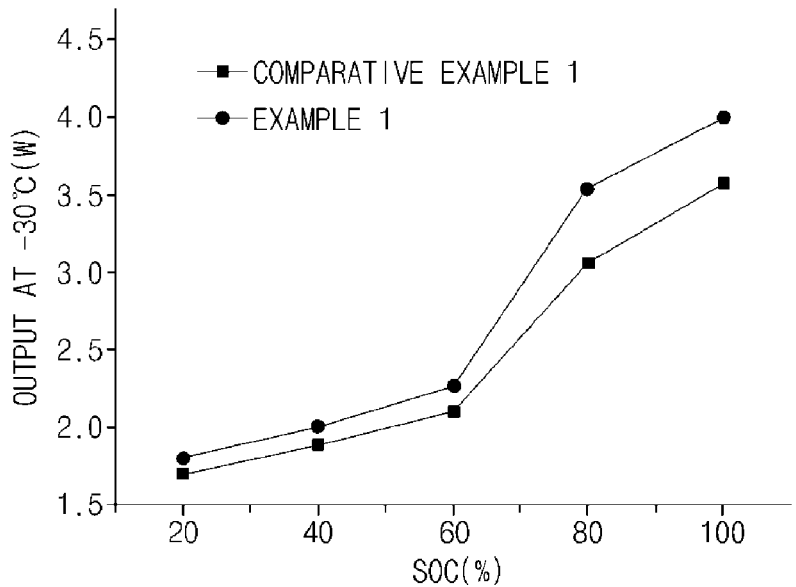
FIG. 1 is a graph illustrating the results of the measurement of low-temperature output characteristics of lithium secondary batteries of Example 1 and Comparative Example 1, according to Experimental Example 1.

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A non-aqueous electrolyte solution according to an embodiment of the present invention includes lithium bis(fluorosulfonyl)imide (LiFSI).

Since the lithium bis(fluorosulfonyl)imide is added as a lithium salt to the non-aqueous electrolyte solution to form a robust solid electrolyte interface (SEI) on an anode, the lithium bis(fluorosulfonyl)imide may improve low-temperature output characteristics. Also, the lithium bis(fluorosulfonyl)imide may inhibit the decomposition of the surface of a cathode, which may occur during a high-temperature cycle, and may prevent an oxidation reaction of the electrolyte solution.

According to an embodiment of the present invention, a concentration of the lithium bis(fluorosulfonyl)imide in the non-aqueous electrolyte solution may be in a range of 0.1 mole/l to 2 mole/l, for example, 0.5 mole/l to 1.5 mole/l. In the case that the concentration of the lithium bis(fluorosulfonyl)imide is less than 0.1 mole/l, effects of improving the low-temperature output and high-temperature cycle characteristics of the lithium secondary battery may be insignificant. In the case in which the concentration of the lithium bis(fluorosulfonyl)imide is greater than 2 mole/l, side reactions in the electrolyte solution may excessively occur during charge and discharge of the battery, and thus, a swelling phenomenon may occur.

In order to further prevent the side reactions, the non-aqueous electrolyte solution of the present invention may further include a lithium salt. Any lithium salt typically used in the art may be used as the lithium salt. For example, the lithium salt may include any one selected from the group consisting of $LiPF_6$, $LiAsF_6$, $LiCF_3SO_3$, $LiN(CF_3SO_2)_2$, $LiBF_6$, $LiSbF_6$, $LiN(C_2F_5SO_2)_2$, $LiAlO_4$, $LiAlCl_4$, $LiSO_3CF_3$ and $LiClO_4$, or a mixture of two or more thereof.

A mixing ratio of the lithium salt to the lithium bis(fluorosulfonyl)imide may be in a range of 1:6 to 1:9 as a molar ratio. In the case that the mixing ratio of the lithium salt to the lithium bis(fluorosulfonyl)imide is outside the range of the molar ratio, the side reactions may excessively occur in the electrolyte solution during the charge and discharge of the battery, and thus, the swelling phenomenon may occur.

Specifically, in the case in which the mixing ratio of the lithium salt to the lithium bis(fluorosulfonyl)imide is less than 1:6 as a molar ratio, the enormous amount of irreversible reactions may occur during a process of forming the SEI in the lithium-ion battery and a process of intercalating lithium ions, which are solvated by propylene carbonate, into the anode, and the effects of improving the low-temperature output, and the cycle characteristics and capacity characteristics after high-temperature storage of the secondary battery may be insignificant due to the exfoliation of an anode surface layer (e.g., carbon surface layer) and the decomposition of the electrolyte solution. Also, an electrolyte solution additive according to an embodiment of the present invention may include a vinylene carbonate-based compound and a sultone-based compound. The vinylene carbonate-based compound, together with lithium bis(fluorosulfonyl)imide, may form a SEI by being added to the electrolyte solution.

A type of the vinylene carbonate-based compound is not particularly limited as long as it may achieve the above objectives. For example, the vinylene carbonate-based compound may include vinylene carbonate, vinylene ethylene carbonate, or a combination thereof. Among these materials, vinylene carbonate may be particularly used.

In this case, an amount of the vinylene carbonate-based compound is not particularly limited as long as it is an amount required for attaining the effects of the present invention, such as the improvement of low-temperature output and high-temperature cycle characteristics, and for example, may be in a range of 0.1 wt % to 5 wt % based on a total weight of the electrolyte solution. In the case that the amount of the vinylene carbonate-based compound is less than 0.1 wt %, an effect of forming an SEI, which is expected according to the addition, may not be sufficiently obtained. In the case in which the amount of the vinylene carbonate-based compound is greater than 5 wt %, the enhancement effect is limited, but irreversible capacity may be increased or resistance may be increased by forming an excessively thick SEI. Also, some of the vinylene carbonate-based compound that remains after forming the SEI may be used for compensating the SEI. However, when the amount thereof is excessively large, a side reaction may occur between the vinylene carbonate-based compound and a cathode active material.

The electrolyte solution additive according to the embodiment of the present invention may include a sultone-based compound. The sultone-based compound may include a sultone group.

The sultone-based compound, for example, may be any one selected from the group consisting of 1,3-propane sultone, 1,4-butane sultone, and 1,3-propene sultone, or a mixture of two or more thereof. Among these materials, 1,3-propane sultone may be particularly used. In this case, an amount of the sultone-based compound is not particularly limited as long as it is an amount required for attaining the effects of the present invention, such as the improvement of low-temperature output and high-temperature cycle characteristics, and for example, may be in a range of 0.01 wt % to 5 wt % based on the total weight of the electrolyte solution.

In addition, the non-aqueous electrolyte solution according to the embodiment of the present invention may further include one or more compounds selected from the group consisting of LiBF$_4$, lithium oxalyldifluoroborate (LiODFB), and ethylene sulfate (ESa), as an additive. Also, for example, the non-aqueous electrolyte solution may include two or more compounds selected from the group consisting of LiBF4, LiODFB, and ESa. The additive may prevent a side reaction in the electrolyte solution during the charge and discharge of the lithium secondary battery including an excessive amount of lithium bis(fluorosulfonyl)imide at room temperature. Accordingly, the additive may effectively improve cycle characteristics of the battery at room temperature. In this case, an amount of each additive may be in a range of 0.01 wt % to 5 wt % based on the total weight of the electrolyte solution. When the amount of the additive added to the non-aqueous electrolyte solution is excessively small, the additive may be entirely consumed during the initial operation of the lithium secondary battery, and thus, the lifetime may decrease during charge and discharge or long-term storage. When the amount of the additive is excessively large, a side reaction of the remaining additive may adversely affect capacity and stability characteristics of the battery. In consideration of such phenomena, a total amount of the additive, for example, may be in a range of 1 wt % to 10 wt % based on the total weight of the electrolyte solution.

Also, a non-aqueous organic solvent, which may be included in the non-aqueous electrolyte solution, is not limited as long as it may minimize the decomposition due to the oxidation reaction during the charge and discharge of the battery and may exhibit desired characteristics with the additive. For example, the non-aqueous organic solvent may include cyclic carbonate, linear carbonate, ester, ether, or ketone. These materials may be used alone or in a combination of two or more thereof.

Among the above organic solvents, carbonate-based organic solvents may be particularly used. Examples of the cyclic carbonate may be any one selected from the group consisting of ethylene carbonate (EC), propylene carbonate (PC), and butylene carbonate (BC), or a mixture of two or more thereof. Examples of the linear carbonate may be any one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof.

A lithium secondary battery according to an embodiment of the present invention may include a cathode, an anode, a separator disposed between the cathode and the anode, and the non-aqueous electrolyte solution. The cathode and the anode may include a cathode active material and an anode active material, respectively.

Herein, the cathode active material may include a manganese-based spinel active material, lithium metal oxide, or a mixture thereof. Furthermore, the lithium metal oxide may be selected from the group consisting of lithium-cobalt-based oxide, lithium-manganese-based oxide, lithium-nickel-manganese-based oxide, lithium-manganese-cobalt-based oxide, and lithium-nickel-manganese-cobalt-based oxide, and for example, may include LiCoO$_2$, LiNiO$_2$, LiMnO$_2$, LiMn$_2$O$_4$, Li(Ni$_a$Co$_b$Mn$_c$)O$_2$ (where $0<a<1$, $0<b<1$, $0<c<1$, and $a+b+c=1$), LiNi$_{1-Y}$Co$_Y$O$_2$, LiCo$_{1-Y}$Mn$_Y$O$_2$, LiNi$_{1-Y}$Mn$_Y$O$_2$ (where $0\le Y<1$), Li(Ni$_a$Co$_b$Mn$_c$)O$_4$ (where $0<a<2$, $0<b\le2$, $0<c<2$, and $a+b+c=2$), LiMn$_{2-z}$Ni$_z$O$_4$, and LiMn$_{2-z}$Co$_z$O$_4$ (where $0<z<2$).

As the anode active material, a carbon-based anode active material, such as crystalline carbon, amorphous carbon, or a carbon composite, may be used alone or in a mixture of two or more thereof.

Also, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination of two or more thereof as the separator. In addition, a typical porous nonwoven fabric, for example, a nonwoven fabric formed of high melting point glass fibers or polyethylene terephthalate fibers may be used. However, the separator is not limited thereto.

EXAMPLES

Hereinafter, the present invention will be described in more detail, according to examples and experimental examples. However, the present invention is not limited thereto.

Example 1

[Preparation of Electrolyte Solution]

A non-aqueous electrolyte solution was prepared by adding 0.1 mole/l of LiPF$_6$ and 0.9 mole/l of lithium bis(fluorosulfonyl)imide, as a lithium salt, and 3 wt % of vinylene carbonate (VC) and 0.5 wt % of 1,3-propane sultone (PS), as an additive, based on a total weight of the electrolyte solution to a non-aqueous organic solvent having a composition, in which a volume ratio of ethylene carbonate (EC):ethylmethyl carbonate (EMC):dimethyl carbonate (DMC) was 3:3:4.

[Preparation of Lithium Secondary Battery]

A cathode mixture slurry was prepared by adding 92 wt % of a mixture of LiMn$_2$O$_4$ and Li(Ni$_{0.33}$Co$_{0.33}$Mn$_{0.33}$)O$_2$ as a cathode active material, 4 wt % of carbon black as a conductive agent, and 4 wt % of polyvinylidene fluoride (PVdF) as a binder to N-methyl-2-pyrrolidone (NMP) as a solvent. An about 20 μm thick aluminum (Al) thin film as a cathode current collector was coated with the cathode mixture slurry and dried, and the Al thin film was then roll-pressed to prepare a cathode.

Also, an anode mixture slurry was prepared by adding 96 wt % of carbon powder as an anode active material, 3 wt % of PVdF as a binder, and 1 wt % of carbon black as a conductive agent to NMP as a solvent. A 10 μm thick copper (Cu) thin film as an anode current collector was coated with the anode mixture slurry and dried, and the Cu thin film was then roll-pressed to prepare an anode.

A polymer type battery was prepared by a typical method using a separator formed of three layers of polypropylene/polyethylene/polypropylene (PP/PE/PP) with the cathode and anode thus prepared, and a lithium secondary battery was then completed by injecting the prepared non-aqueous electrolyte solution.

Example 2

A non-aqueous electrolyte solution and a lithium secondary battery were prepared in the same manner as in Example 1 except that 0.14 mole/l of LiPF$_6$ and 0.86 mole/l of lithium bis(fluorosulfonyl)imide (ratio of about 1:6) were used as a lithium salt based on a total weight of the non-aqueous electrolyte solution.

Example 3

A non-aqueous electrolyte solution and a lithium secondary battery were prepared in the same manner as in Example 1 except that 1 wt % of ethylene sulfate (ESa) was further added as an additive based on a total weight of the non-aqueous electrolyte solution.

Example 4

A non-aqueous electrolyte solution and a lithium secondary battery were prepared in the same manner as in Example 1 except that 1 wt % of ESa and 0.5 wt % of $LiPF_4$ were further added as an additive based on a total weight of the non-aqueous electrolyte solution.

Example 5

A non-aqueous electrolyte solution and a lithium secondary battery were prepared in the same manner as in Example 1 except that 1 wt % of ESa and 0.5 wt % of lithium oxalyldifluoroborate (LiODFB) were further added as an additive based on a total weight of the non-aqueous electrolyte solution.

Comparative Example 1

A non-aqueous electrolyte solution and a lithium secondary battery were prepared in the same manner as in Example 1 except that $LiPF_6$ was used alone as a lithium salt.

Comparative Example 2

A non-aqueous electrolyte solution and a lithium secondary battery were prepared in the same manner as in Example 1 except that an electrolyte solution additive, which did not include VC and PS, was used as an additive.

Comparative Example 3

A non-aqueous electrolyte solution and a lithium secondary battery were prepared in the same manner as in Example 1 except that 0.17 mole/l of $LiPF_6$ and 0.83 mole/l of lithium bis(fluorosulfonyl)imide (ratio of about 1:5) were used as a lithium salt based on a total weight of the non-aqueous electrolyte solution.

Experimental Example 1

<Low-Temperature Output Characteristics Test of Lithium Secondary Battery>

Low-temperature outputs were calculated from voltage differences which were obtained by discharging the lithium secondary batteries of Example 1 and Comparative Example 1 at 0.5 C for 10 seconds for the state of charge (SOC) at −30° C. The results thereof are presented in FIG. 1.

Referring to FIG. 1, in a case where the SOC was 100%, it may be understood that the lithium secondary battery of Example 1 had low-temperature output characteristics that were improved about 1.2 times in comparison to that of the lithium secondary battery of Comparative Example 1. Similarly, in a case where the SOC was 20%, 40%, 60%, and 80%, the same results as those of the case in which the SOC was 100% may be obtained.

Experimental Example 2

<High-Temperature Cycle Characteristics Test of Lithium Secondary Battery>

The lithium secondary batteries of Example 1 and Comparative Examples 1 and 2 were charged at 1 C to 4.2 V/38 mA at 55° C. under a constant current/constant voltage (CC/CV) condition and then discharged at a constant current (CC) of 3 C to a voltage of 3.03 V to measure discharge capacities. The charge and discharge were repeated 1 to 900 cycles and the measured discharge capacities are presented in FIG. 2.

Figure 2:
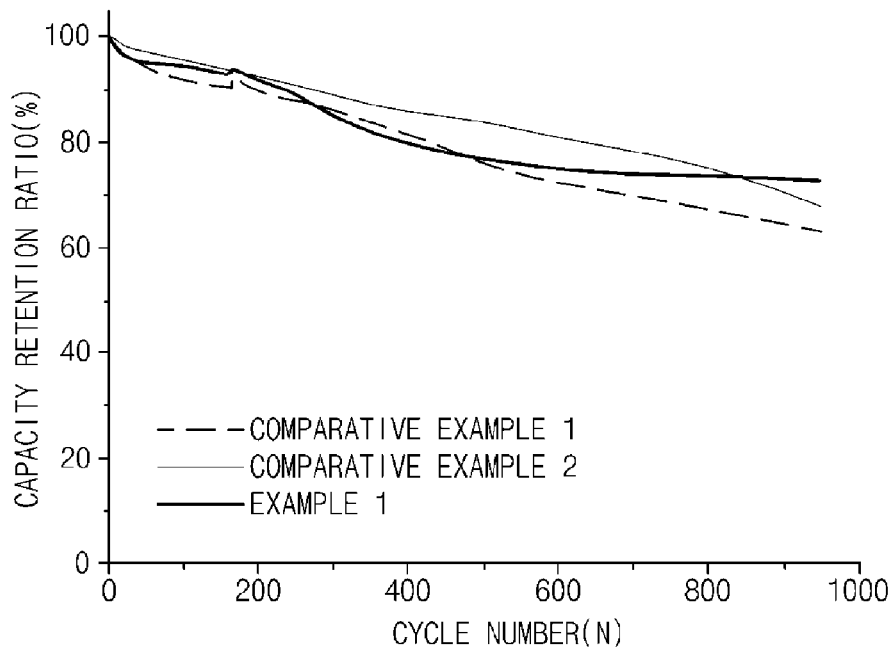
FIG. 2 is a graph illustrating the results of the measurement of high-temperature (55° C.) cycle characteristics of lithium secondary batteries of Example 1 and Comparative Examples 1 and 2, according to Experimental Example 2.

Referring to FIG. 2, with respect to high-temperature cycle characteristics, the lithium secondary battery of Example 1 initially exhibited a capacity retention ratio similar to those of Comparative Examples 1 and 2 to a $200^{th}$ cycle. It may be identified that the capacity retention ratio of Example 1 was gradually increased as the number of cycles increased, in particular, after a $600^{th}$ cycle, was significantly increased in comparison to Comparative Example 1 after the $600^{th}$ cycle, and was increased in comparison to Comparative Example 2 after about a $820^{th}$ cycle.

Therefore, it may be confirmed that the capacity retention ratio was excellent when $LiPF_6$, lithium bis(fluorosulfonyl) imide, VC, and PS were used in combination.

Experimental Example 3

<Output Characteristics after High-Temperature Storage of Lithium Secondary Battery>

The lithium secondary batteries of Example 1 and Comparative Example 1 were stored at 60° C., and outputs were then calculated from voltage differences which were obtained by discharging the lithium secondary batteries at 5 C for 10 seconds at 50% SOC. The results thereof are presented in FIG. 3.

Figure 3:
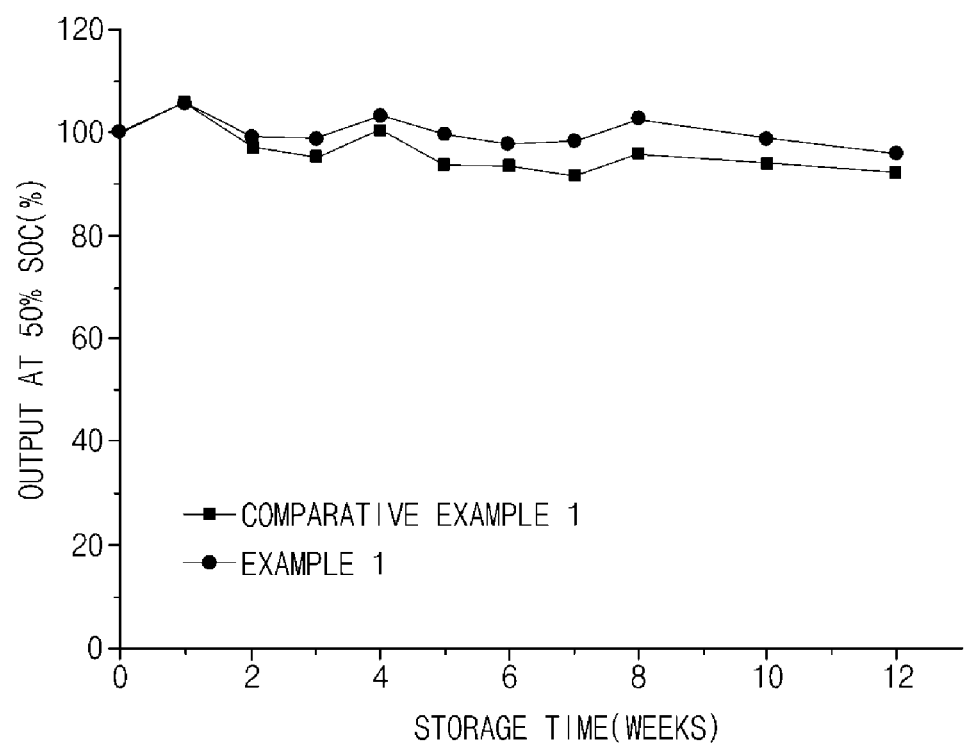
FIG. 3 is a graph illustrating the results of the measurement of output characteristics after high-temperature storage of lithium secondary batteries of Example 1 and Comparative Example 1, according to Experimental Example 3.

Referring to FIG. 3, it may be understood that high-temperature output of the lithium secondary battery of Example 1 was better than high-temperature output of the lithium secondary battery of Comparative Example 1 regardless of storage time. In particular, it may be understood that a difference between high-temperature output characteristics was further increased after a storage time of 4 weeks.

Experimental Example 4

<Capacity Characteristics Test after High-Temperature Storage of Lithium Secondary Battery>

The lithium secondary batteries of Example 1 and Comparative Example 1 were charged at 1 C to 4.2 V/38 mA under a constant current/constant voltage (CC/CV) condition and then discharged at a constant current (CC) of 1 C to a voltage of 3.0 V to measure discharge capacities. The results thereof are presented in FIG. 4.

Figure 4:
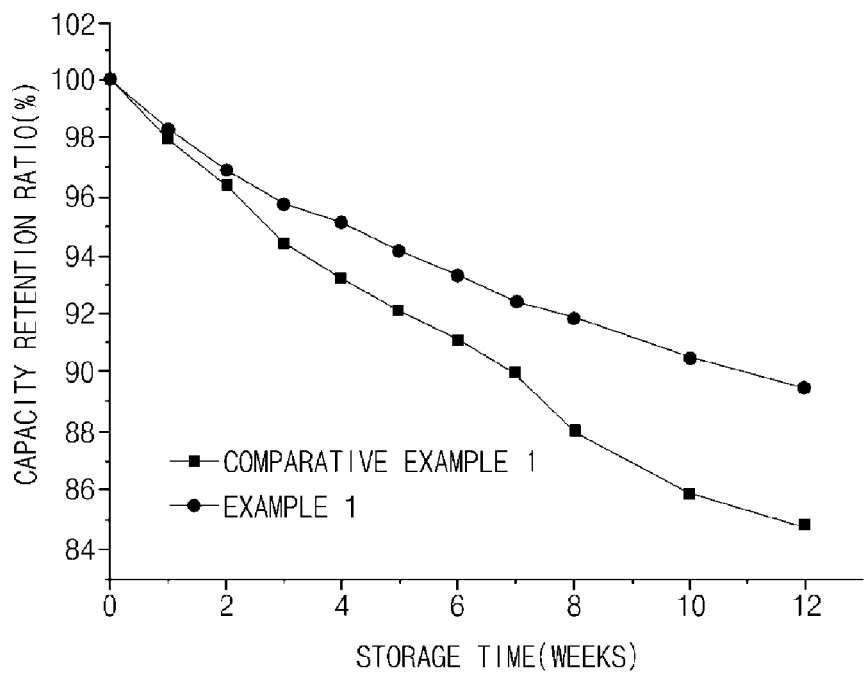
FIG. 4 is a graph illustrating the results of the measurement of capacity characteristics after high-temperature storage of lithium secondary batteries of Example 1 and Comparative Example 1, according to Experimental Example 4.

Referring to FIG. 4, a slope of the capacity retention ratio of the lithium secondary battery of Example 1 was slower than that of the lithium secondary battery of Comparative Example 1 to a storage time of 12 weeks. In contrast, it may be understood that the capacity retention ratio of the lithium secondary battery of Comparative Example 1 was rapidly decreased after a storage time of 2 weeks.

Thus, it may be confirmed that the capacity characteristics after high-temperature storage of the lithium secondary battery, in which $LiPF_6$, lithium bis(fluorosulfonyl)imide, VC, and PS were used in combination, were significantly improved in comparison to the lithium secondary battery of Comparative Example 1.

Experimental Example 5

<Low-Temperature Output Characteristics Test According to Molar Ratio of $LiPF_6$ to LiFSI>

In order to investigate low-temperature output characteristics according to a molar ratio of $LiPF_6$ to LiFSI, low-temperature outputs were calculated from voltage differences which were obtained by discharging the lithium secondary batteries of Examples 1 and 2 and Comparative Example 3 at 0.5 C for 10 seconds for the SOC at −30° C. The results thereof are presented in FIG. 5.

Figure 5:
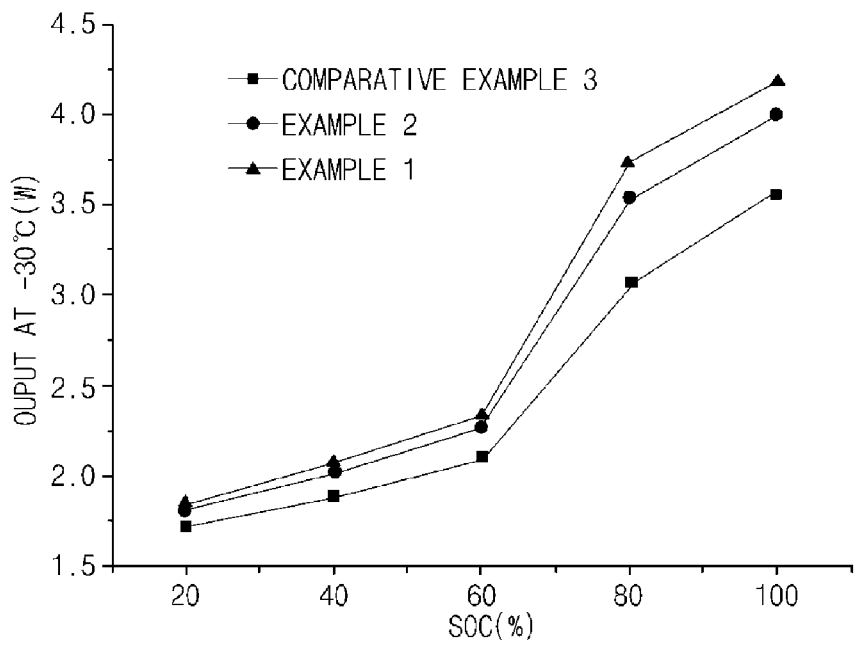
FIG. 5 is a graph illustrating the results of the measurement of low-temperature output characteristics of lithium secondary batteries of Examples 1 and 2 and Comparative Example 3, according to Experimental Example 5.

Referring to FIG. 5, the lithium secondary batteries of Examples 1 and 2 respectively having a molar ratio of $LiPF_6$ to LiFSI of 1:9 and 1:6 had significantly better output characteristics from 20% SOC than the lithium secondary battery of Comparative Example 3 having a molar ratio of $LiPF_6$ to LiFSI of 1:5. From 60% SOC, the output characteristics of the lithium battery of Examples 1 and 2 began to exhibit a more significant difference from those of the lithium battery of Comparative Example 3.

Therefore, it may be confirmed that the low-temperature output characteristics of the lithium secondary battery may be improved by adjusting the molar ratio of $LiPF_6$ to LiFSI.

Experimental Example 6

<High-Temperature (55° C.) Cycle Characteristics Test According to Molar Ratio of $LiPF_6$ to LiFSI>

In order to investigate high-temperature (55° C.) cycle characteristics according to the molar ratio of $LiPF_6$ to LiFSI, the lithium secondary batteries of Examples 1 and 2 and Comparative Example 3 were charged at 1 C to 4.2 V/38 mA at 55° C. under a CC/CV condition and then discharged at a CC of 3 C to a voltage of 3.03 V to measure discharge capacities. The charge and discharge were repeated 1 to 1,000 cycles and the measured discharge capacities are presented in FIG. 6.

Figure 6:
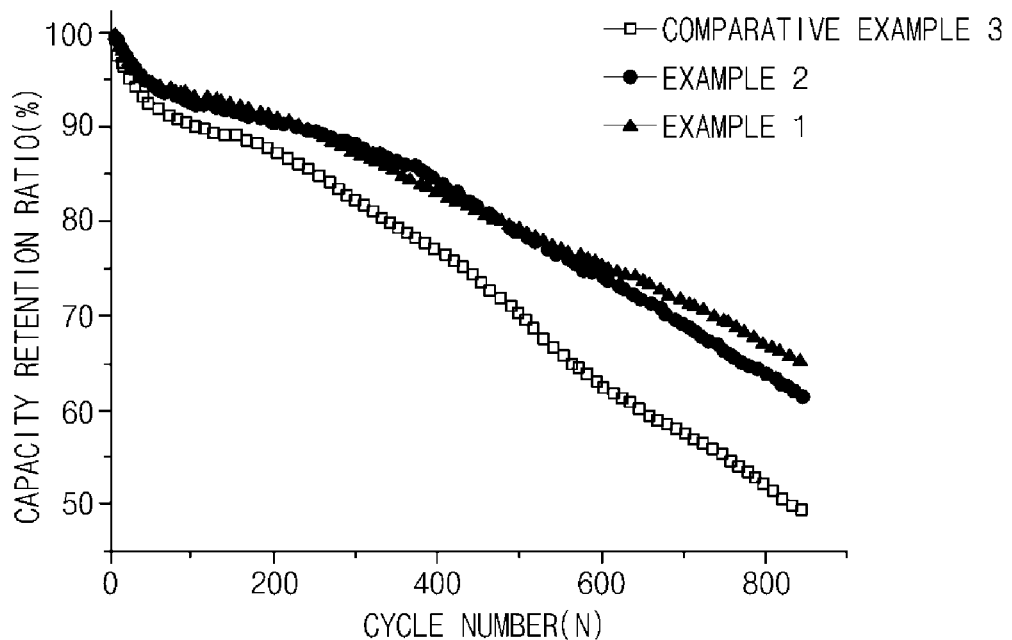
FIG. 6 is a graph illustrating the results of the measurement of high-temperature cycle characteristics of lithium secondary batteries of Examples 1 and 2 and Comparative Example 3, according to Experimental Example 6.

As illustrated in FIG. 6, the lithium secondary batteries of Examples 1 and 2 according to the present invention exhibited capacity retention ratios similar to that of Comparative Example 3 to about a $70^{th}$ cycle. However, a significant difference of about 12% or more in the capacity retention ratio may be obtained from about the $70^{th}$ cycle to a $1,000^{th}$ cycle.

Therefore, it may be confirmed that the high-temperature (55° C.) cycle characteristics of the lithium secondary battery, in a case where the molar ratio of $LiPF_6$ to LiFSI was in a range of 1:6 to 1:9, were significantly better than those of the battery in the case in which the molar ratio was outside the above range.

Experimental Example 7

<Capacity Characteristics after High-Temperature Storage (60° C.) Test According to Molar Ratio of $LiPF_6$ to LiFSI>

In order to investigate capacity characteristics after high-temperature (60° C.) storage according to the molar ratio of $LiPF_6$ to LiFSI, the lithium secondary batteries of Examples 1 and 2 and Comparative Example 3 were stored at 60° C. for 12 weeks and then charged at 1 C to 4.2 V/38 mA under a CC/CV condition. Then, the lithium secondary batteries were discharged at a CC of 1 C to a voltage of 3.0 V to measure discharge capacities. The results thereof are presented in FIG. 7.

Figure 7:
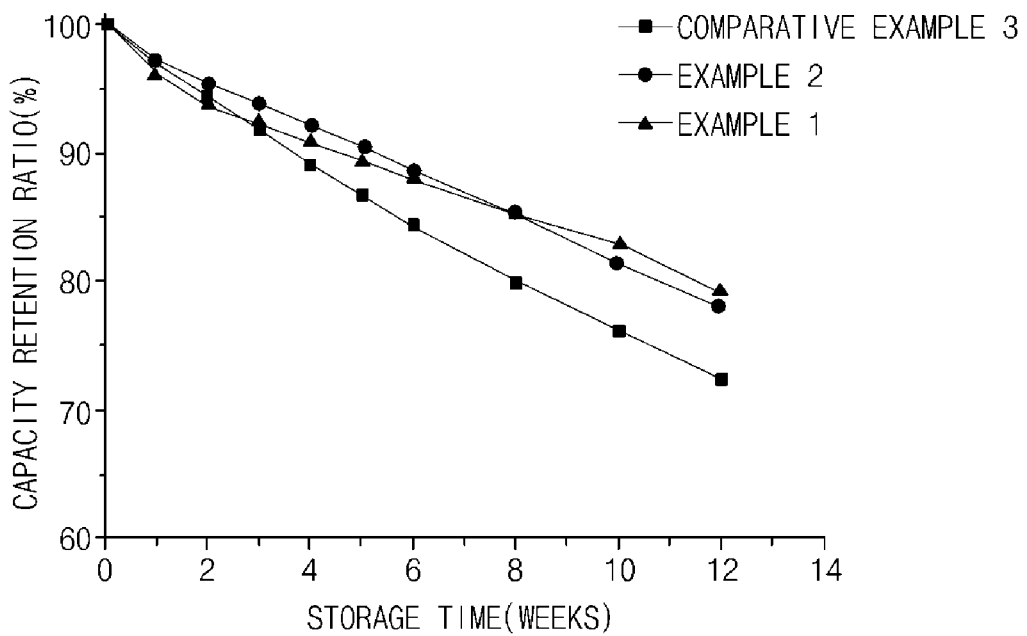
FIG. 7 is a graph illustrating the results of the measurement of output characteristics after high-temperature storage of lithium secondary batteries of Examples 1 and 2 and Comparative Example 3, according to Experimental Example 7.

Referring to FIG. 7, there was no difference between capacity characteristics of the lithium secondary batteries of Examples 1 and 2 and capacity characteristics of the lithium secondary battery of Comparative Example 3 to a storage time of 1 week. However, after a storage time of 2 weeks, it may be understood that the difference between the capacity characteristics of Examples 1 and 2 was increased in comparison to Comparative Example 3.

Specifically, the lithium secondary battery of Example 1 exhibited capacity characteristics slightly lower than the lithium secondary battery of Example 2 to a storage time of 8 weeks. However, the capacity characteristics of Example 1 were better than those of Example 2 after 8 weeks, and a slope of a graph of Example 1 was slower than that of Example 2. That is, it may be confirmed that capacity characteristics under a high-temperature storage condition were excellent when the excessive amount of LiFSI was added. Also, the lithium secondary batteries of Examples 1 and 2 exhibited a difference of about 10% or more in the capacity retention ratio from the lithium secondary battery of Comparative Example 3 at a storage time of 12 weeks.

It may be confirmed that the capacity characteristics of the lithium secondary battery of Comparative Example 3 were gradually decreased as the storage time increased while a slope of a graph of the lithium secondary battery of Comparative Example 3 was significantly decreased after a storage time of 2 weeks.

Therefore, the high-temperature storage characteristics of the lithium secondary battery may be improved by adjusting the molar ratio of $LiPF_6$ to LiFSI. In particular, it may be confirmed that the high-temperature storage characteristics of the lithium secondary, in the case that the molar ratio of $LiPF_6$ to LiFSI was in a range of 1:6 to 1:9, were significantly better than those of the lithium secondary battery in the case in which the molar ratio was outside the above range.

Experimental Example 8

<Room Temperature (25° C.) Cycle Characteristics Test of Examples 3 to 5>

In order to investigate room temperature (25° C.) cycle characteristics according to the addition of one or more compounds selected from the group consisting of $LiBF_4$, lithium oxalyldifluoroborate (LiODFB), and ethylene sulfate (ESa) to an electrolyte solution, the lithium secondary batteries of Examples 3 to 5 were charged at 1 C to 4.2 V/38 mA at 25° C. under a constant current/constant voltage (CC/CV) condition and then discharged at a constant current (CC) of 2 C to a voltage of 3.03 V to measure discharge capacities. The charge and discharge were repeated 1 to 1,200 cycles and the measured discharge capacities are presented in FIG. 8.

Figure 8:
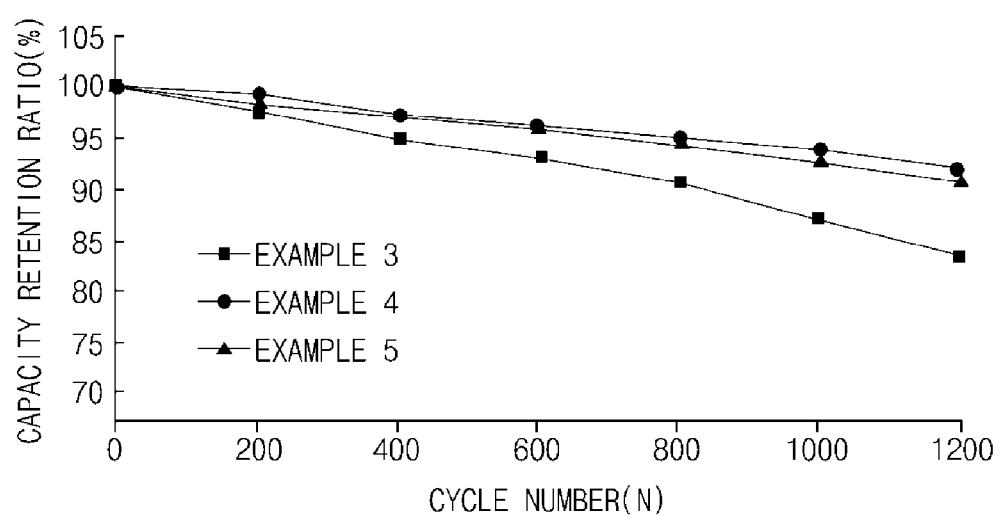
FIG. 8 is a graph illustrating the results of the measurement of capacity characteristics after room temperature storage of lithium secondary batteries of Examples 3 to 5, according to Experimental Example 8.

As illustrated in FIG. 8, it may be confirmed that the lithium secondary batteries of Examples 3 to 5 according to the present invention exhibited capacity retention ratios similar to one another to about a $70^{th}$ cycle and Examples 3 to 5 exhibited good capacity characteristics over 1,200 cycles. In particular, it may be confirmed that capacity characteristics from about the $70^{th}$ cycle to a $1,200^{th}$ cycle of the lithium secondary batteries having a combination of two kinds of additives (Examples 4 and 5) were better.

The invention claimed is:

1. A non-aqueous electrolyte solution comprising:
   i) lithium bis(fluorosulfonyl)imide (LiFSI);
   ii) a lithium salt;
   iii) an electrolyte solution additive including a vinylene carbonate-based compound and a sultone-based compound; and
   iv) a non-aqueous organic solvent,
   wherein a mixing ratio of the lithium salt to the lithium bis(fluorosulfonyl)imide is in a range of 1:6 to 1:9 as a molar ratio,
   wherein the non-aqueous organic solvent is selected from the group consisting of linear carbonate, cyclic carbonate, ether, ketone, and mixtures thereof,
   wherein an amount of the vinylene carbonate-based compound is in a range of 0.1 wt % to 5 wt % based on the total weight of the electrolyte solution, and
   wherein an amount of the sultone-based compound is in a range of 0.01 wt % to 5 wt % based on the total weight of the electrolyte solution.

2. The non-aqueous electrolyte solution of claim 1, wherein a concentration of the lithium bis(fluorosulfonyl)imide in the non-aqueous electrolyte solution is in a range of 0.1 mole/l to 2 mole/l.

3. The non-aqueous electrolyte solution of claim 1, wherein the lithium salt comprises any one selected from the group consisting of $LiPF_6$, $LiAsF_6$, $LiCF_3SO_3$, $LiN(CF_3SO_2)_2$, $LiBF_6$, $LiSbF_6$, $LiN(C_2F_5SO_2)_2$, $LiAlO_4$, $LiAlCl_4$, $LiSO_3CF_3$ and $LiClO_4$, or a mixture of two or more thereof.

4. The non-aqueous electrolyte solution of claim 1, wherein the vinylene carbonate-based compound comprises vinylene carbonate, vinylene ethylene carbonate, or a combination thereof.

5. The non-aqueous electrolyte solution of claim 1, wherein the sultone-based compound is any one selected from the group consisting of 1,3-propane sultone, 1,4-butane sultone, and 1,3-propene sultone, or a mixture of two or more thereof.

6. The non-aqueous electrolyte solution of claim 1, further comprising one or more compounds selected from the group consisting of $LiBF_4$, lithium oxalyldifluoroborate (Li-ODFB), and ethylene sulfate (ESa).

7. The non-aqueous electrolyte solution of claim 1, further comprising two or more compounds selected from the group consisting of $LiBF_4$, lithium oxalyldifluoroborate (Li-ODFB), and ethylene sulfate (ESa).

8. The non-aqueous electrolyte solution of claim 1, wherein the cyclic carbonate is any one selected from the group consisting of ethylene carbonate (EC), propylene carbonate (PC), and butylene carbonate (BC), or a mixture of two or more thereof, and the linear carbonate is any one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof.

9. A lithium secondary battery comprising:
   a cathode;
   an anode; and
   the non-aqueous electrolyte solution of claim 1.

* * * * *